C. CATON.
Combined Caliper, Divider, &c.

No. 159,246.

Patented Feb. 2, 1875.

Witnesses.
H. T. Cornell
M. C. Crosby

Inventor.
C. Caton
Per Burridge & Co.
Attys.

UNITED STATES PATENT OFFICE.

CHARLES CATON, OF COSHOCTON, OHIO.

IMPROVEMENT IN COMBINED CALIPERS, DIVIDERS, &c.

Specification forming part of Letters Patent No. 159,246, dated February 2, 1875; application filed October 13, 1874.

*To all whom it may concern:*

Be it known that I, CHARLES CATON, of Coshocton, in the county of Coshocton and State of Ohio, have invented a certain new and Improved Combined Dividers, Caliper, and Circumferentor, of which the following is a full and complete description, reference being had to the accompanying drawings, making part of this specification, in which—

Figure 1:
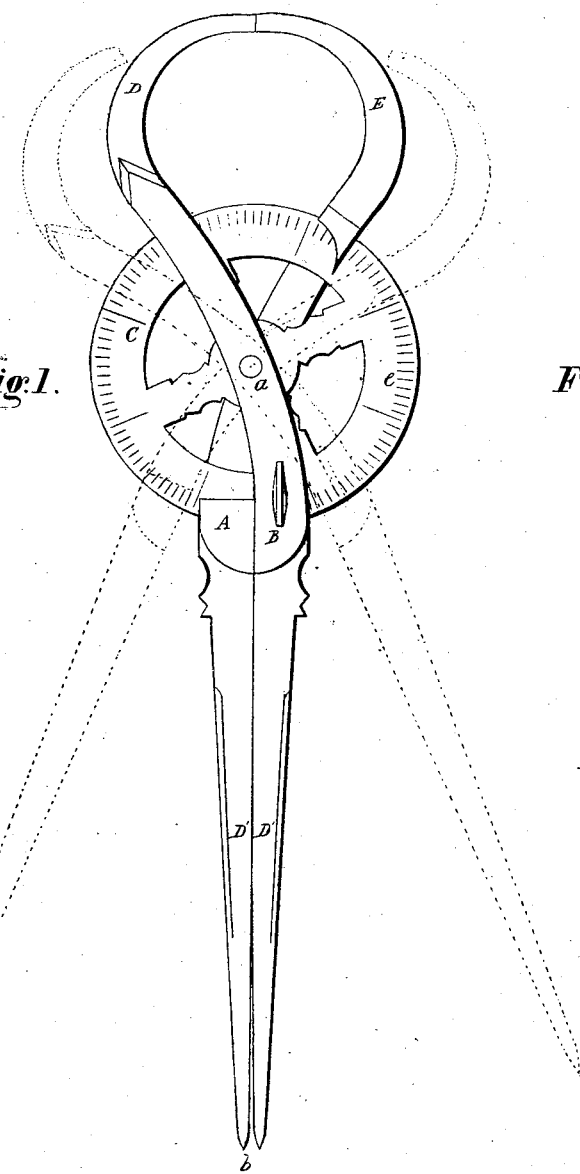
Figure 2:
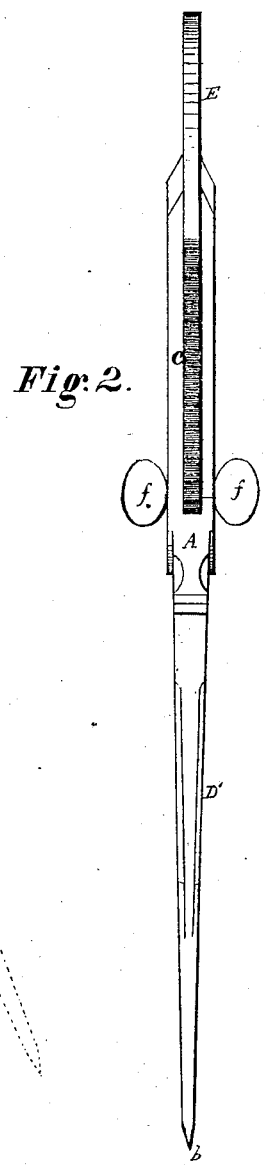

Figure 1 is a side view of the implement. Fig. 2 is an edge view.

Like letters of reference refer to like parts in the several views.

This invention is a pair of dividers, a pair of calipers, and a circumferentor combined, thereby embracing in one implement the usefulness of three in a single and convenient form.

Of the construction and operation of the aforesaid invention the following is a detailed description.

This implement consists of five sections, A, B, C, D, and E. The sections A B, which include the sections D E as part thereof, are pivoted to each other at *a*, from one side of which they extend in long narrow shanks D′ D′, terminating in sharp points *b*, forming a pair of dividers. The opposite end of the two sections A B are so curved as to form two semicircular arms, D E, thereby making a pair of calipers, as shown in Fig. 1. Section C referred to consists of a wheel arranged between the sections A B, having for an axis the pivotal point *a*, as shown in the drawing.

On one side of the wheel C is a scale of inches, *e*, and fractions thereof.

The manner of using the implement will be very apparent, and which simply consists in expanding the sections, as indicated by the dotted lines. To this end one of the thumb-screws *f* is loosened, and which is also used for retaining the dividers or calipers in position while being used.

In order to use the circumferentor, the sections are shut together. Both the set-screws must be loosened, so that the wheel shall have freedom to revolve. The implement is held by the shanks D′, and the wheel then applied to the circumference of the object to be measured in the ordinary way, and the distance counted by the scale *e* referred to.

What I claim as my invention, and desire to secure by Letters Patent, is—

1. The sections A B, with the index-wheel C pivoted between said sections, and all upon a common axis, *a*, so as to admit of independent movement of said parts, substantially as and for the purpose set forth.

2. The index-wheel C and axis *a*, in combination with the set-screws *f* and sections A B, pivoted to said axis on each side of the wheel C, and the limbs of the sections extending beyond the periphery of the wheel, all substantially as and for the purpose set forth.

CHARLES CATON.

Witnesses:
J. S. ELLIOTT,
LEW. E. WHITMORE.